United States Patent
Hrabal

(10) Patent No.: US 11,590,810 B2
(45) Date of Patent: Feb. 28, 2023

(54) DEVICE FOR MAINTAINING AND CHANGING THE PRESSURE IN TIRES

(71) Applicant: CODA Innovations s.r.o., Prague (CZ)

(72) Inventor: František Hrabal, Prague (CZ)

(73) Assignee: CODA Innovations s.r.o., Prague (CZ)

(*) Notice: Subject to any disclaimer, the term of this patent is extended or adjusted under 35 U.S.C. 154(b) by 0 days.

(21) Appl. No.: 17/334,880

(22) Filed: May 31, 2021

(65) Prior Publication Data
US 2021/0283959 A1 Sep. 16, 2021

Related U.S. Application Data

(63) Continuation of application No. 16/716,723, filed on Dec. 17, 2019, now abandoned, which is a continuation of application No. 15/659,990, filed on Jul. 26, 2017, now Pat. No. 10,538,132, which is a continuation of application No. 14/359,868, filed as application No. PCT/CZ2012/000114 on Nov. 13, 2012, now Pat. No. 9,744,815.

(30) Foreign Application Priority Data

Nov. 22, 2011 (CZ) .................................. CZ2011-757

(51) Int. Cl.
*B60C 23/12* (2006.01)
*B60C 23/16* (2006.01)
*B60C 23/00* (2006.01)

(52) U.S. Cl.
CPC .......... *B60C 23/004* (2013.01); *B60C 23/123* (2020.05); *B60C 23/135* (2020.05); *B60C 23/16* (2013.01)

(58) Field of Classification Search
CPC ... B60C 23/004; B60C 23/135; B60C 23/123; B60C 23/16; B60C 23/001; B60C 23/10; B60C 23/12; B60C 19/00; B60C 19/04; B29D 30/72
See application file for complete search history.

(56) References Cited

U.S. PATENT DOCUMENTS

| 5,355,924 | A | * | 10/1994 | Olney | B60C 23/133 417/233 |
|---|---|---|---|---|---|
| 8,381,785 | B2 | * | 2/2013 | Losey | B60C 23/135 152/450 |
| 8,651,155 | B2 | * | 2/2014 | Hinque | B60C 23/121 152/426 |
| 2009/0044891 | A1 | * | 2/2009 | Lee | B60C 23/124 417/313 |

(Continued)

FOREIGN PATENT DOCUMENTS

WO WO-2011057591 A2 * 5/2011 ........... B60C 23/007

*Primary Examiner* — John D Walters
(74) *Attorney, Agent, or Firm* — WRB-IP PLLC

(57) ABSTRACT

A device for maintaining and changing the pressure in a is provided whereby the inner pressure space of the tire is connected through a pump to a pressure accumulator which, at its input and/or output into the inner pressure space of the tire, is fitted with at least one pressure control element. The pump can be a peristaltic pump in the shape of a deformable hose placed on the perimeter of the tire, fitted with an air inlet and an air outlet, while the air inlet and the air outlet are positioned on the perimeter of the tire distant from each other by a preset length, dependent on the deformation of the tire.

9 Claims, 3 Drawing Sheets

(56) References Cited

U.S. PATENT DOCUMENTS

2011/0272074 A1* 11/2011 Lowery ................ B60C 23/004
                                                    152/418
2012/0285596 A1* 11/2012 Hrabal ................ B60C 23/135
                                                    152/450

* cited by examiner

DEVICE FOR MAINTAINING AND CHANGING THE PRESSURE IN TIRES

The present application is a continuation of U.S. application Ser. No. 16/716,723, filed Dec. 17, 2019, which is a continuation of U.S. application Ser. No. 15/659,990, filed Jul. 26, 2017, now U.S. Pat. No. 10,538,132, issued Jan. 21, 2020, which is a continuation of U.S. application Ser. No. 14/359,868, filed May 21, 2014, now U.S. Pat. No. 9,744, 815, issued Aug. 29, 2017, which was the U.S. national stage of International Application PCT/CZ2012/000114, filed Nov. 13, 2012, and which claimed priority to Czech Application PV 2011-757, filed Nov. 22, 2011, all of which are incorporated by reference.

BACKGROUND AND SUMMARY

This invention concerns a device for maintaining and changing the pressure in tires.

There are different methods for re-inflating a tire when using an integrated pump that is driven by the tire deformation, the rotation of the wheel, by using an electronic device or by pressure changes in the tyre, etc. All of these systems are used for compensating for under-inflation by re-inflating the tire with ambient air to the pressure specified by the tire manufacturer. Any excess of air may then be released from the tire. This solution requires the purification of the air and communication between the interior and exterior of the tire that might cause contamination. Re-inflation through the exterior of the tire is a relatively lengthy process, however. In the case of a valve failure the tire can become completely deflated, which creates a dangerous condition. The purpose of the device described below is to reduce or to avoid the need for tire inflation by using ambient air.

Based on this invention, the drawbacks described above have, to a large extent, been eliminated by the device for maintaining and changing the pressure in tires. Its operational principle is based on a pump that interconnects the interior of the tire with an accumulator that is supplied with at least one pressure control element at its inlet and/or outlet to the interior of the tire.

The pressure accumulator can either be connected to the tire and/or to the inner tube and/or the rim and/or it can constitute an integral part of the tyre, the inner tube, or the rim. This, in effect, has the advantage that the pressure accumulator is fitted with an additional inlet for ambient air or with an air outlet to the exterior of the tire. Based on this advantageous design, the pump is connected at one end to the interior space of the tire and/or with the exterior of the tire and/or the accumulator and at the other end it is connected with the interior of the tire and/or the exterior of the tire and/or the accumulator.

The principle that this invention also represents is as a device for maintaining and changing the pressure in tires when the pump is a peristaltic pump in the form of a deformable hose positioned on the perimeter of the tyre, i.e. anywhere on tire both including tread and sidewall, inside the tire wall, or on the tire wall or near the tire wall from outside or inside of the tire. The hose is fitted with both an air inlet and outlet, while these are placed apart from each other on the tire perimeter, separated at a preset length, in accordance with the deformation of the tire.

The pump is provided with at least one valve. This means that there will be a section with a minimum volume capacity at the inlet and/or outlet of the pump. The pump can be fitted with a valve, i.e. a three-way valve, with inputs for a pump source and a pump target and while one input is fitted to the valve, the second is connected to the pump and the last input is connected to the closure fixture.

A ring is attached to the inner side of the pump and the distance of its outer edge from the axis of the tire rotation is equal to between a 1 to 1.1 multiple of the distance of the bottom side of the pump from the axis of the tire rotation. The pump has the form of a curved hollow channel with at least one of its outer walls partially formed by the sections of two planes that lie in the same longitudinal direction as the pump, forming an angle of $\alpha=0$ to $120°$, while if $\alpha>0°$, it is located at the contact edge of these two planes, situated on the far side from the centre of the cross-section of the pump.

The principle of the invention also represents a tire and/or rim and/or inner tube containing an adhesive and/or a profile lock for interconnection with any element from the group of the tire and/or rim and/or inner tube and/or pump.

Additionally, the principle of the invention is a tire and/or rim and/or inner tube and/or pump, modified for the placement of any device, in accordance with the above described requirements.

Another principle of the invention is the above described device which constitutes a part of the tyre, inner tube, and/or rim.

A major advantage is that, compared to the familiar system whereby pressure is adjusted by releasing air externally or by refilling with air from outside, this device does not need to be re-inflated with air from outside, thereby avoiding contamination, possible corrosion, and tire failure. Following a drop in the pressure the air is refilled from outside and in the case of excess pressure the air is released to the exterior. Frequently the tires are cold-inflated to a certain pressure level and then, after reaching the presumed temperature, the pressure adjusts to the previously estimated level which, in principle, is a compromise pressure that has been calculated theoretically for the entire nexus—the specific type of tyre, the vehicle, the environment, etc. Therefore the tire doesn't reach the pressure level required in operation until it has warmed-up and even when it is warmed-up the pressure, at best, is close to its ideal status only in a random number of the targeted tires. Based on our model the tyre-accumulator system may simply be overinflated, while the pressure inside the tire is actually ideal, regardless of the temperature and the other operating conditions. It remains true that in our model this can be achieved without any exchange of air with the external environment and even without the need for a valve when the system consists of only a simple pump and an accumulator. The built-in accumulator can ensure a rapid change of pressure when, for example, prior to the vehicle moving through a curve the air from the accumulator is transferred to the selected tyre, which alters its tread contact, and the air is subsequently returned to the accumulator. Or vice versa—in a racing car, for example, the tires rapidly become overinflated on the straights and therefore the tire has minimal resistance and it then deflates and reaches the ideal level of tread contact in the bends.

The peristaltic pump design described here is also simplified to the utmost and a simple hose of the appropriate length can achieve the re-inflation or the deflation of the tire to the pressure that provides the required tread contact. This simplicity of operation increases the reliability of the device, while at the same time reducing its cost.

BRIEF DESCRIPTION OF THE DRAWINGS

The device for maintaining and changing the pressure in will be described in more detail using particular design examples from the attached drawings, in which.

DETAILED DESCRIPTION

Example 1

FIG. 1 shows schematically the pressure accumulator Z, interconnected with the interior space of the tire P. The hollow of the tire is interconnected with the accumulator Z through the pump K. In this example, the cold tire P has a pressure of 2 atm. and the accumulator Z also has a pressure of 2 atm. While driving, the tire P warms up and the total pressure in the tire P increases to 2.3 atm. At the same time, a part of the air volume is being moved by the pump K, represented by a broken-line arrow, into the accumulator Z. The pressure in the rest of the tire P therefore remains at the level of 2 atm. In this example, the pressure in the accumulator Z has increased up to 2.6 atm. This status is shown in FIG. 1a.

Example 2

When the tire P becomes cooler or following leakage of air from the tire P, the air from the accumulator Z returns to the tire P through the preset valve RV and it maintains its desired pressure level. This is shown in FIG. 1, in which the pressure control valve RV passes the air from the accumulator Z in the direction of the grey arrow, the tire P has a pressure of 2 atm. and the accumulator Z has a pressure of less than the original 2.6 atm.

Figure 1A:
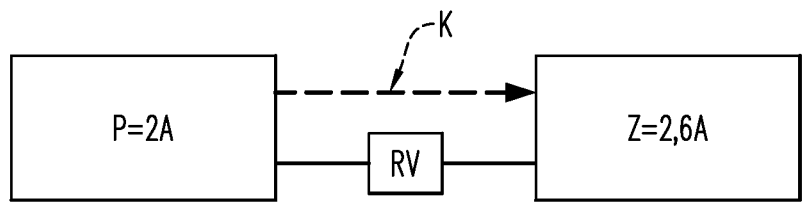
FIGS. 1a to 1e show the specific design elements of the pressure accumulator schematically.
Figure 1B:
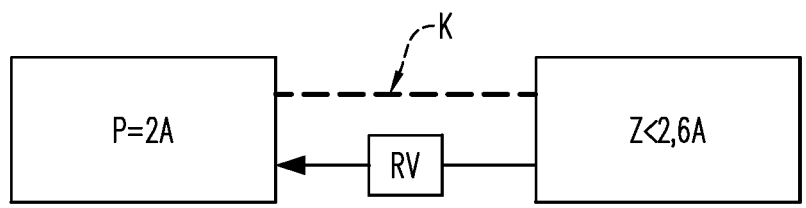
Figure 1C:
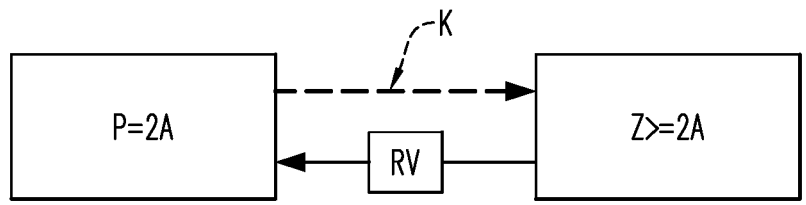

In practice, the pump K can continuously pump air into the accumulator Z while, concurrently, the valve RV can be releasing air back to the tire P, as is shown in FIG. 1c, in which the tire P has a pressure of 2 atm. and the accumulator Z has the same or a higher pressure. In this manner the air is circulated by the pump K from the tire P into the accumulator Z and back, which means that the pump K can be run continuously. The pressure control valve RV can be replaced by a simple opening with a suitable profile and throughput or even by a return valve or another valve, while the air from the accumulator Z can return to the tire P directly through the pump K, or the accumulator Z can be freely interconnected with the tire P. With an assembly such as this, when the pump K is pumping, the pressure in the accumulator Z is also increasing, and when it is not pumping, the pressure in the accumulator Z is decreasing and the pressure in the tire P is increasing until they are equal or until the pump K restarts. The control element RV, whether it is a valve, the pump K or another element, can be placed in front of or behind the pump K or, alternatively, it can be placed in front of or behind the accumulator Z. Air can also be directed from the pump K into the accumulator Z only if the tire P is overinflated; then the air can be moved by the pump K only from the tire P or into the tire P and therefore the output of the pump K is directed to the accumulator Z only as necessary, or the input of the pump K from the tire P can be closed.

The tire P can also be significantly overinflated during its first use, in comparison with the required value, and during the first ride any excessive air will then be pumped into the accumulator Z, where it will be retained until the time of its further use for compensating against leaks or against cold.

The air can be stored in the accumulator Z or drawn back from it even in a situation in which there is a change in the operating conditions, such as the driving style, the vehicle load or a weather change that also requires a change to the pressure of the tire P. The accumulator Z may also be overinflated during the first mounting of the tire P and subsequently the air can be pumped between the accumulator Z and the tire P or even from/to the outside by use of the pump K. One or more pumps K can thereby re-inflate the tires P either from outside O or from the accumulator Z or, in turn, draw the air from outside O or from the tire P into the accumulator Z. The accumulator Z can be situated directly in the pressure space or the inner tube of the tire P or outside them.

When the pressure in the tire P and the accumulator Z is lower than that required and it is effective to draw it from outside O or from the tire P then the pump K can be used to re-inflate the tire P or the accumulator Z from outside O. It may also be effective to use the pump K to pump the air from the accumulator Z into the tire P; in this case, for example, the pump K could re-inflate the tire P despite the fact that this would create negative pressure in the accumulator Z.

The pump K can thereby be interconnected with multiple-directional valves on either its input and/or its output, which would then direct the air from the outside O, the accumulator Z, or the tire P to the outside O, to the accumulator Z, or to the tire P as needed.

Figure 1D:
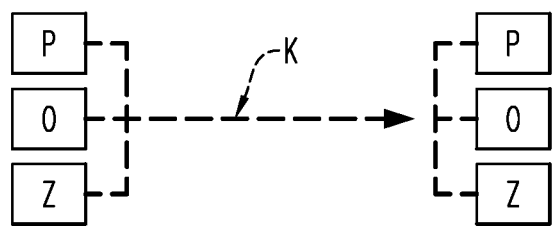
Figure 1E:
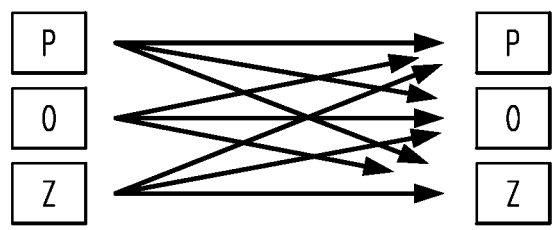

These options are delineated in FIG. 1d, in which the pump K has 3 sources at its input as well as at its output and is distributing air between them in different variants as shown in FIG. 1e.

Example 3

The length of the tread contact of the tire P can be used for controlling the pressure in the tire P. For example, the peristaltic pump uses hose cross deformation for its functioning; this deformation moves longitudinally through the hose and pushes the compressed or transported medium forward. Thereby the peristaltic pump located in the tire wall or close to it can make use of the lengthwise motion of the tire deformation for its functioning when loaded.

The length of the tire tread deformation corresponds to the inflation of the tire. This means that if the deformation length becomes too great the tire will be underinflated and if the deformation length is too short the tire will be overinflated. If a tire with a pressure of 3 atm. is interconnected, using the peristaltic pump, with the outside environment of the tire that has a pressure of 1 atm. and the pump is designed in such a manner that when rolling forward it moves the air towards the tyre, while, at the same time, this design does not include any valves, the following options are possible:

The tire rolls forward and air from outside moves through the peristaltic pump chamber into the tire as it is rolling and moving the deformation through the chamber. However, if the deformation disappears from the chamber through the output opening, while, at the same time, no deformation has yet occurred at the chamber input opening, then the chamber connects the tire with the outside and air can flow freely outside the tire until the chamber is compressed at a certain point and is disconnected by the deformation. The leakage of the air can be terminated by another deformation of the tire during a new rotation or also by the increase of the tread contact of the deflated tire and thereby also increasing the length of the deformation; this deformation will gradually reach as far as the input or output of the chamber and will disconnect it.

The peristaltic pump can be designed in such a manner that before the deformation leaves from one end of the chamber, the deformation will close the chamber at the other end. The air from the tire thereby cannot pass further back into the chamber than to this deformation point, which will then force the air back into the tire. The volume of air that has been drawn into the chamber will thereby be sealed off at its end from its source by the new deformation, prior to the disappearance of the original deformation at its head that connects this volume with the tire inner space and forces it into the tire. In such a case, the volume of new air that was closed in the chamber, between its parts closed by the deformation, will get into the tire. The volume defined in this manner is transported and forced into the tire.

Figure 2A:
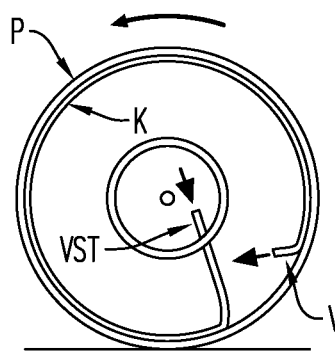
FIGS. 2a to 2i show the hose-shaped chamber inside the tire schematically.
Figure 2B:
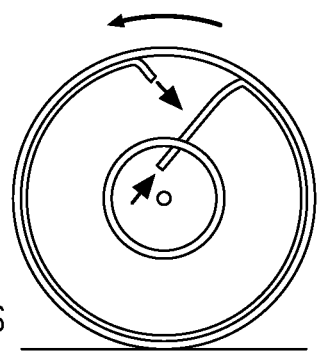
Figure 2C:
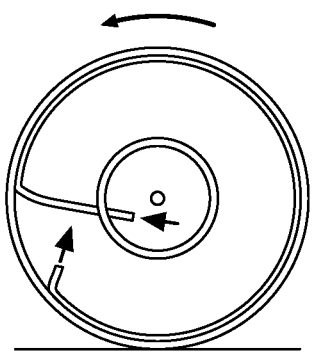
Figure 2D:
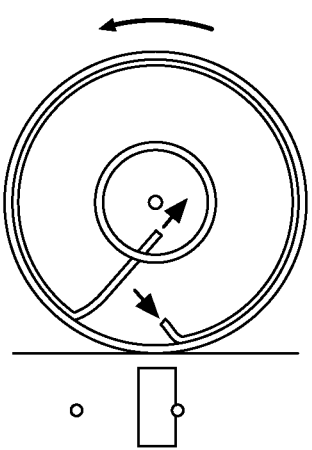

FIG. 2a shows the pump K in the shape of the tubular chamber encompassed by the tire casing. The input VST into the chamber is drawing the air from outside O into the chamber and, at the same time, the chamber contents are forced out into the tire through its output VYS. In this example the chamber is not fitted with any valves. FIGS. 2b and 2c show the partial rotation of the tire in the direction of the arrow and the movement of the air from outside into the chamber, represented by the arrow at the input VST and simultaneously from the chamber into the tyre, as shown by the arrow at the output VYS. In FIG. 2d the chamber reaches the position in which it is not loaded with any deformation and the chamber freely interconnects the inside of the tire with the outside and the air from the tire is able to flow out freely.

This figure already shows a tread contact in the form of a grey rectangle with the points indicating where the last chamber-tread contact is situated. These points are represented as small circles.

Figure 2E:
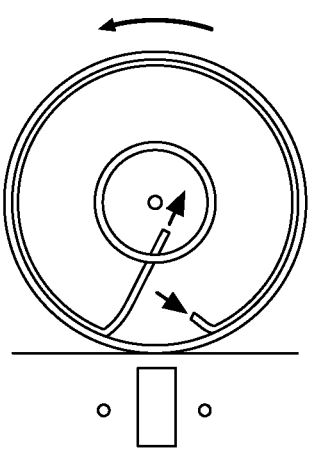
Figure 2F:
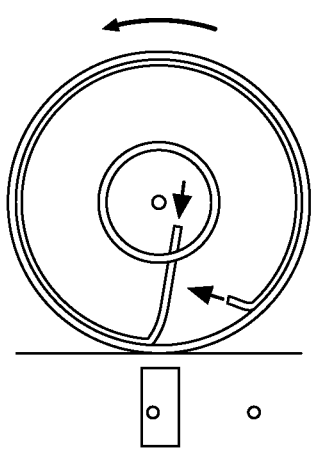

The direction of the air flow arrows has changed. The air from the tire is moved into the chamber under pressure and from the chamber it is emerging into the outside environment. FIG. 2e shows the leak continuing until the tire turns into the position shown in FIG. 2f, at which point the chamber will be disconnected by the tire deformation and subsequently air will move into the tire by being drawn in from outside where the status is reaching the position shown in FIG. 2a and is going round and round. The volume of the leaked air depends on the length of time during which the chamber has not been loaded with the deformation, i.e. the length of the tire perimeter, without the chamber deformation, and the rotation rate.

Figure 2G:
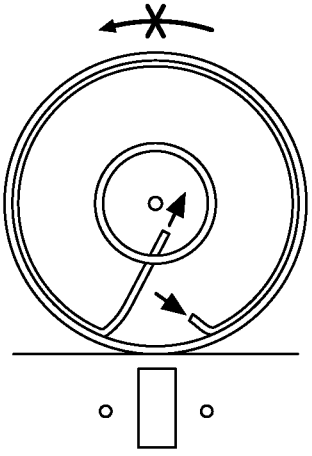
Figure 2H:
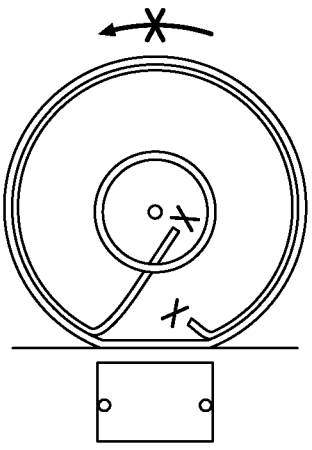
Figure 2I:
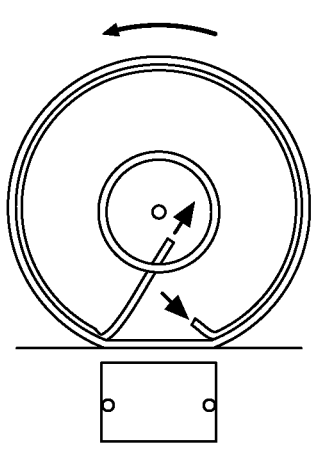

The same situation exists in the example shown in FIG. 2g as that in FIG. 2e, except that the tire rotation has ceased, which is depicted by the crossed rotation arrow above the picture. The air flows out of the tire freely through the opening VYS into the chamber and out of it again through the opening VST. The air leakage results in a broader tread contact. After a certain time the situation returns to the status shown in FIG. 2h, whereby the chamber is disconnected by the deformation and no air is flowing out through the chamber. The length of the tread contact has thereby stopped the air leak.

In this manner it is possible to design a system through which, by setting the chamber length, it is possible to ensure that the tire will be re-inflated only when the tread contact length is greater than the desired length and at the same time it is possible to ensure that subsequently the re-inflation is completed. Additionally, the tire can even be deflated if the tread contact is too short, until the right length has been reached. A higher inflation pressure value desired at a greater speed can also be ensured.

In practice, a valve can be added to this system to prevent leakage, for example, in situations in which the entire wheel is of the ground or for reasons of adjustment. At the same time a non-deformable part of the chamber can be included into the system. Before it starts to draw in the air through the valve, the chamber must pump out the air from its non-deformable part and only after its evacuation will the valve be opened and start re-inflating steadily. This works in a similar manner even when the non-deformable part is placed in front of the valve if it is separating the chamber from the target area. The chamber then needs, for example, two full rotations to evacuate the air from this ineffective capacity and only after that will it start moving the air regularly from the source and/or to the target.

Example 4

The main purpose of the pump is to re-pump the air into the area of higher pressure. Examples 1 and 2 describe the accumulator being placed inside the tyre; Example 3 then describes a chamber that can be set up in such a manner that it only pumps when the tread contact is longer than the desired value.

If one pump is moving the air from the tire P into the accumulator Z and then the accumulator Z is deflating the air into the intermediate accumulator MZ so that this intermediate accumulator has a consistently lower pressure than that of the tire P, then the pump described in Example 3 can re-pump the air from this intermediate accumulator MZ into the tire P only if the tread contact is longer than the desired value. Similarly, if the tread contact is shorter than the desired value, air can be drawn off from the tire P into the accumulator Z.

Figure 3A:
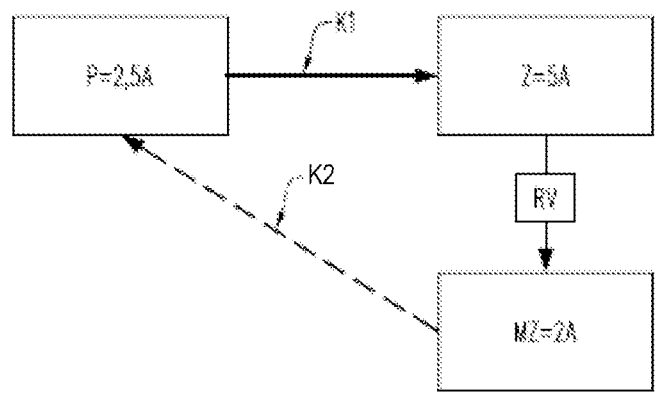
FIGS. 3a to 3c show the connection to the chamber inside the tire.
Figure 3B:
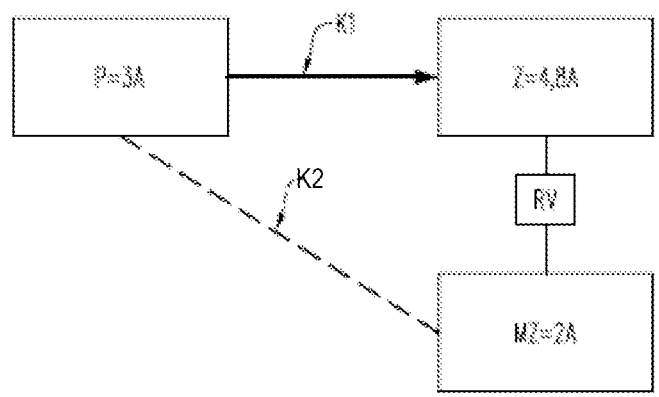

In FIG. 3a there is an underinflated tire P=2.5 atm., which is connected to the accumulator Z with the pressure of 5 atm. by the pump K1; the air from the accumulator Z passes through the valve RV into the intermediate accumulator MZ where a constant pressure of 2 atm. is being maintained by the valve RV. As the tread contact of the tire P is longer than required, the pump K2 is pumping air from the intermediate accumulator MZ into the tire P. After the tread contact of the tire P becomes shorter, which in this case occurs under a pressure of 3 atm., the pump K2 ceases pumping and the system will enter into the state shown in FIG. 3b. The tire P has a pressure of 3 atm., the accumulator Z has a pressure of 4.8 atm. and the intermediate accumulator MZ has a pressure of 2 atm.

Figure 3C:
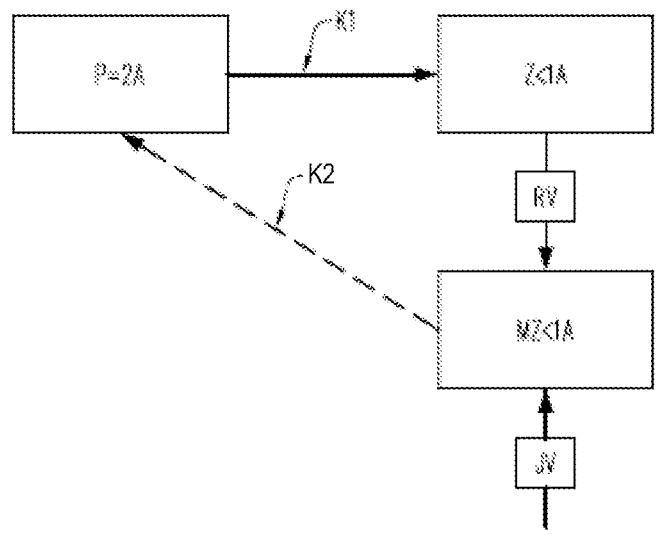

If the pump K2 has a higher delivery rate than does pump K1, the situation can arise, for example, in which the tire P becomes punctured, whereby all the air from both the accumulator Z and the intermediate accumulator MZ will be moved into tire P through the pump K2 and a negative pressure against the outer atmosphere will occur there. If the space of the accumulator Z or of the intermediate accumulator MZ is interconnected with another air source, in this case with the outside O of the tire P, it will start to draw in air from it. This is shown in FIG. 3c, in which the intermediate accumulator MZ is drawing in air through the valve JV. If a small leak is being compensated the whole system can be re-inflated in this manner up to the values shown in FIG. 3a.

INDUSTRIAL UTILITY

The device for maintaining and changing the pressure in tyres, according to this technical solution, will find use especially for passenger and commercial vehicles.

The invention claimed is:

1. A device for maintaining pressure in a tire, comprising:
   a first accumulator;
   a second accumulator;
   a first pump arranged to interconnect an inner pressure space of the tire and the first accumulator,
   a valve arranged to interconnect the first accumulator and the second accumulator,
   a second pump arranged to interconnect the second accumulator and the inner pressure space of the tire.

2. The device of claim 1, wherein the first pump comprises a chamber having deformable walls at least partially defining the chamber, the walls having shape memory.

3. The device of claim 1, wherein the second pump comprises a chamber having deformable walls at least partially defining the chamber, the walls having shape memory.

4. The device of claim 3, wherein the tire is deformed over a length of deformation when the tire is inflated to a pressure within a design pressure range and subjected to a threshold load.

5. The device of claim 4, wherein a length of the chamber is less than or equal to the length of deformation.

6. The device of claim 1, wherein the valve comprises a check valve.

7. The device of claim 1, wherein the second accumulator is interconnected with a second valve, and the second valve connected to the environment.

8. The device of claim 1, wherein the first pump comprises a peristaltic pump including a deformable hose positioned on a perimeter of the tire.

9. The device of claim 1, wherein the second pump comprises a peristaltic pump including a deformable hose positioned on a perimeter of the tire.

\* \* \* \* \*